United States Patent
Betti et al.

(10) Patent No.: US 7,295,764 B2
(45) Date of Patent: Nov. 13, 2007

(54) DATA-FILE STORAGE, PARTICULARLY FOR MPEG FORMAT FILES

(75) Inventors: Giorgio Betti, Pogliano Milanese (IT); Angelo Dati, Abbiategrasso (IT); Viviana D'Alto, Cassina de' Pecchi (IT); Danilo Pau, Sesto S. Giovanni (IT); Filippo Santinello, Vimercate (IT)

(73) Assignee: SIMicroelectronics S.r.l. (IT)

( * ) Notice: Subject to any disclaimer, the term of this patent is extended or adjusted under 35 U.S.C. 154(b) by 1098 days.

(21) Appl. No.: 10/177,729

(22) Filed: Jun. 20, 2002

(65) Prior Publication Data

US 2003/0026596 A1    Feb. 6, 2003

(30) Foreign Application Priority Data

Jun. 21, 2001   (IT) ................... MI2001A1309

(51) Int. Cl.
H04N 7/26 (2006.01)

(52) U.S. Cl. .......... 386/114; 386/111; 386/112; 386/124; 386/125

(58) Field of Classification Search .............. 386/81, 386/95, 111–112, 124–125, 114
See application file for complete search history.

(56) References Cited

U.S. PATENT DOCUMENTS

| | | | |
|---|---|---|---|
| 5,757,826 A * | 5/1998 | Fredrickson | 714/784 |
| 6,711,140 B1 * | 3/2004 | Agarwal et al. | 370/324 |
| 6,950,557 B2 * | 9/2005 | Kimura | 382/239 |
| 7,006,575 B2 * | 2/2006 | Yamaguchi et al. | 375/240.26 |
| 7,142,235 B2 * | 11/2006 | Herley | 348/231.2 |
| 2004/0146108 A1 * | 7/2004 | Hsia | 375/240.16 |
| 2004/0223549 A1 * | 11/2004 | Karczewicz et al. | 375/240.16 |
| 2005/0185715 A1 * | 8/2005 | Karczewicz et al. | 375/240.12 |
| 2007/0065030 A1 * | 3/2007 | Shen et al. | 382/238 |

* cited by examiner

Primary Examiner—Thai Q. Tran
Assistant Examiner—Helen Shibru
(74) Attorney, Agent, or Firm—Lisa K. Jorgenson; Bryan Santarelli; Graybeal Jackson Haley LLP

(57) ABSTRACT

A method of storing a data file, particularly in the MPEG format and including a flow of different frames, comprises a protection system for the data file based on a parameter stored in the data file. Advantageously, the storage method comprises selectively protecting the frames by storing parameters that are associated with corresponding different frames whose values are selected to provide a playing quality level requested by an end user. Also, a method is provided for decoding a data file, particularly of the MPEG type and including a flow of different frames, wherein the data file is stored per above.

32 Claims, 5 Drawing Sheets

Hard BER

DATA-FILE STORAGE, PARTICULARLY FOR MPEG FORMAT FILES

BACKGROUND

1. Technical Field

The present invention relates generally to a method of storing a data file, particularly a file in the MPEG format.

Specifically, the invention relates to a method of storing a data file, in particular of the MPEG type and comprising a flow of different "frames", said method comprising a system for protecting said data file, which system takes into account a redundancy factor stored in said data file.

The invention further relates to a method of decoding a data file, in particular an MPEG type of file that comprises a flow of different frames, said data file being stored by a selectively protecting storage method.

The invention relates, particularly but not exclusively, to a method of storing audio/video files in the MPEG format for application to video recorders, this description making reference to this field of application for convenience of illustration only.

2. Prior Art

As is well known, PVRs (Personal Video Recorders) are an expanding branch of the HDD (Hard Disk Drive) market.

In particular, HDDs for use in PVRs are required to exhibit a high storage capacity for storing files of considerable size, as audio/video (AV) files are, to be cost-efficient.

To optimize the storage space taken up, it is common to compress the audio/video (AV) files using different standards. A common compression format is the MPEG (Moving Pictures Experts Group) format.

In particular, the MPEG standard of compression provides for each flow of images to be resolved into a succession of frames, advantageously described as basic images and difference images (i.e., images including differences from the basic ones).

Taking the instance of a moving object against a stationary background, an explanation of the MPEG Standard can be approximated by the following: an image is processed by first storing a complete accurate starting image (basic image); thereafter, only variations of each following image from the basic image are encoded, and only the difference-image stored.

In fact, the images that follow the starting image typically contain an unchanged part (i.e. information that is redundant for the purpose of storing the moving images) of the starting image. The MPEG Standard effectively removes the need to store a large amount of unnecessary data, in particular data concerning the unchanged part of an image, and advantageously reduces the overall size of the compressed audio/video (AV) file, i.e. of the resultant file in the MPEG format.

In particular, the MPEG Standard provides a set of special algorithms for compressing a sequence S of digital images, which algorithms are directed to reduce space and time redundancies in the sequence S.

Space redundancy is reduced by compressing each image independently with mathematical operations such as quantization, discrete cosine transform, and Huffman encoding.

Time redundancy is reduced by utilizing the relation that exists between successive images in the sequence S, each image being expressed as a translation of the preceding and/or the following image in the sequence S.

As an overview, the MPEG Standard provides three types of basic image or basic frame:

I-frame (Intra coded frame), where the whole basic-image is encoded to provide a reference for storing the frames to follow;

P-frame (Predicted frame), where only the difference of information from one other frame, such as the I-frame, is encoded, so a P-frame has a reduced informational contents; and B-frame (Bidirectionally predicted frame), where image variations due to the motion described by the frame sequence are typically encoded with reference to multiple other frames (P or I).

Any one sequence S starts with an I-frame and goes on as an alternating succession of P-frames and B-frames, as shown in FIG. 1.

It should be noted that I-frames are encoded independently, P-frames are encoded relative to either an I- or a P-type previous frame in the sequence S, and B-frames are encoded relative to two frames, of the I- or P-type, being a previous and a following one in the sequence S.

A typical succession of images could be: I B B P B B P B B I B. . . , this being in particular the order in which the images are displayed. In actual practice, due to the above-outlined definition of the I-, P- and B-frames, an image decoder in the MPEG format is necessary that receives the P-frames ahead of the B-frames, and the I-frames ahead of the P-frames, as in the sequence illustrated by FIG. 1.

As shown in FIG. 2, a system adapted to carry out the MPEG compression just described, indicated as MPEG system 1, comprises at least one sequential encoder CODs effective to receive an initial image IM1 comprising a series of frames in an initial order, and to encode them in accordance with the algorithms of MPEG Standard, to eventually produce the sequence S shown in FIG. 1.

The MPEG system 1 further includes a decoder DEC effective to rearrange and decode such frames to enable display of a final image IM2.

In particular, to encode a B-frame, the encoder CODs is required to retain, in a special memory called the frame memory, the previously encoded (and already decoded) I- and P-frames to which the B-frame is related.

All this requires an amount of memory, specially for encoding and decoding according to the MPEG Standard.

In addition, the MPEG system 1 should be capable of detecting errors and protecting private information. For example, important data can be duplicated and lost packets retrieved.

It should be noted that, in consequence of the hierarchy enforced on the frames by the MPEG Standard, the same error in different type frames would carry different weights. In particular, if one or more bytes in a B-frame becomes corrupted, the ultimate image may include an error that is not perceivable by an end user, but several corrupted bytes in a I-frame can deteriorate a whole sequence of frames.

To give a quantitative idea, take the instance of HDDs as used in a PC, in workstations, or network servers. An error allowance of $1*E^{-12}$ to $1*E^{-14}$ is specified for such HDDs, depending on the application involved. Such high levels of reliability are achieved by encoding user's data using chained codes, namely:

an internal (or line) code COD-I; and an external code COD-E with error detecting and correcting facilities.

The internal code COD-I provides periodic up-dating or refreshing for a loop path of a R/W channel, and especially for a timing recovery loop. The internal code COD-I also provides an amount of SNR gain, i.e. enables good performance, with reference to the encoding error, even at low SNR values.

The external code COD-E is more often a Reed-Solomon code (code RS). This code RS has three characterizing parameters:
- the length m of the symbol employed;
- the interleaving depth IN; and
- the number of redundant symbols in each interleave, or redundancy value indicate with 2t.

With the redundancy value given as 2t, a number of errors equal to one half the redundancy value, i.e. equal t, can be detected and corrected.

Actually, codes are known whereby the locations of wrong symbols can be found, marking them by means of "erasures": in this case a number 2t of errors corrected. However, most of the commercially available hard disks are not equipped with such codes.

At the end of external RS-code processing, an encoded data sector 2 has the structure shown in FIG. 3, where the encode parameters are the following values:

$$IN=3 \quad 2t=4$$

This outlines an instance where two errors can be detected and corrected per interleave.

In particular, shown schematically in FIG. 3 are:
- a sequence 3 of user's data D1, . . . , Dk;
- a memory array 4 where the user's data D1, . . . , Dk are reordained as appropriate; and
- encoded data sector 2.

It should be noted that each sector 2 includes essentially three logic sections, containing:
(I) user's data;
(II) redundant data;
(III) symbols of a CRC (Cycle Redundancy Check) code, i.e. a code that only allows detection of errors, if any; actually, two codes $CRC_1$, and $CRC_2$ are appended to each sector 2.

The CRC code is usually employed to check that a sector 2 has been re-read properly. In other words, the CRC code is employed to check if the RS-encoding process has applied wrong corrections.

In conventional systems, the protection must be afforded uniformly to the data stored in a hard disk. Thus, the amount of redundant data is set at a maximum tmax, to provide all-round reliability.

To determine the performance of a hard disk, it is known to calculate the BER (Byte Error Rate) of the system following RS decoding, i.e. after decoding a file that has been encoded by RS coding, according to a corresponding BER input to a decoder DEC where the RS decoding is effected.

It is customary in this field of application to refer to the byte error rate output from the decoder DEC as the "hard" BER, and to the byte error rate input to the decoder DEC as the "soft" BER, as shown schematically in FIG. 4.

Taking an input soft BER of $10^{-5}$ to the decoder DEC, the plot of the hard BER against time t is shown schematically in FIG. 5. For example, a hard BER of $10^{-14}$ ensures that the system will be a reliable one. In particular, worst-case, best-case, and intermediate hard BERs are plotted, with the worst and best cases being dependent on the error events over the interleaves.

The admissible values for the hard BERs depend on the RS encode/decode applications. In particular, in the instance of audio/video (AV) files, e.g. motion-image or musical pieces, these values are very high due to the requirements for high-fidelity playing. Furthermore, on account of the large size of audio/video files, the demand for accuracy greatly expands the memory requirements of video/audio applications.

Consequently, a need has arisen for a method of storing compressed audio/video files, whereby playing fidelity can be acceptable for an end user, while the storage space requirements of such files can be reduced so allowing the use of hard disk HDD of reduced size, thereby overcoming the limitations of prior art audio/video file storage methods and obviating the need of large inconvenient HDDs.

SUMMARY OF THE INVENTION

In one aspect of the invention, MPEG files are stored with selective protection, i.e. with different hard BER values according to the type of audio/video file involved and the level of playing fidelity expected by an end user.

According to an embodiment of the invention, a method of storing a data file, particularly in the MPEG format and comprising a flow of different frames, comprises a data-file protection system based on a parameter stored in said data file, and is characterized in that said frames are selectively protected by storing parameters that are associated with corresponding different frames and have values selected to provide a playing quality level specified by an end user.

According to another embodiment of the invention, a method of decoding a data file, particularly in the MPEG format and including a flow of different frames, said data file being stored by a storage method according to an embodiment of the invention, characterized in that the method comprises the following steps:
- receiving a data file;
- scanning each received frame, and for each frame verifying said values stored in said identification byte of said data file;
- decoding each frame using redundancy factors that are different and correspond to said values stored in said identification byte.

BRIEF DESCRIPTION OF THE DRAWINGS

The features and advantages of the storage and the decoding method of this invention will become apparent from the following description of embodiments thereof, given by way of non-limitative examples with reference to the accompanying drawings.

In the drawings.

DETAILED DESCRIPTION

The following discussion is presented to enable one skilled in the art to make and use the invention. Various modifications to the disclosed embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

The instance of an HDD for recording audio/video (AV) files will be considered herein for convenience of illustration.

Advantageously according to an embodiment of this invention, each audio/video file is associated with a different hard BER tolerance, according to the frame type to be processed and the audio/video quality requested by an end user.

Thus, it is conceivable that an end user would expect high-fidelity when playing motion-images and music, and accept a lower quality level when news and sport services are played.

Figure 1:
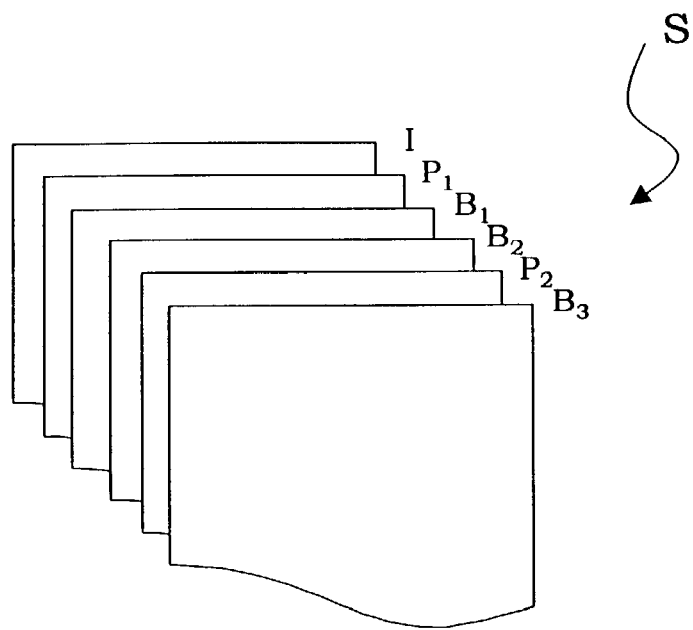
FIG. 1 shows a conventional sequence of images according to the MPEG Standard.
Figure 2:
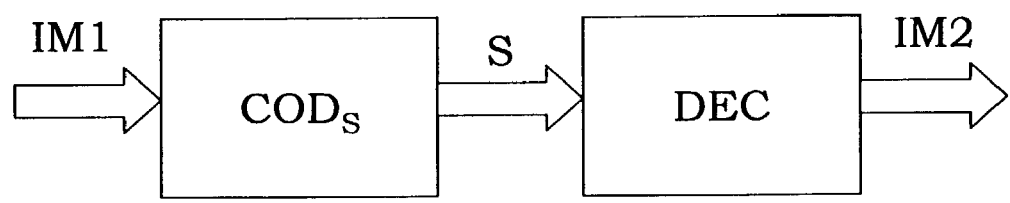
FIG. 2 shows a conventional MPEG system.
Figure 3:
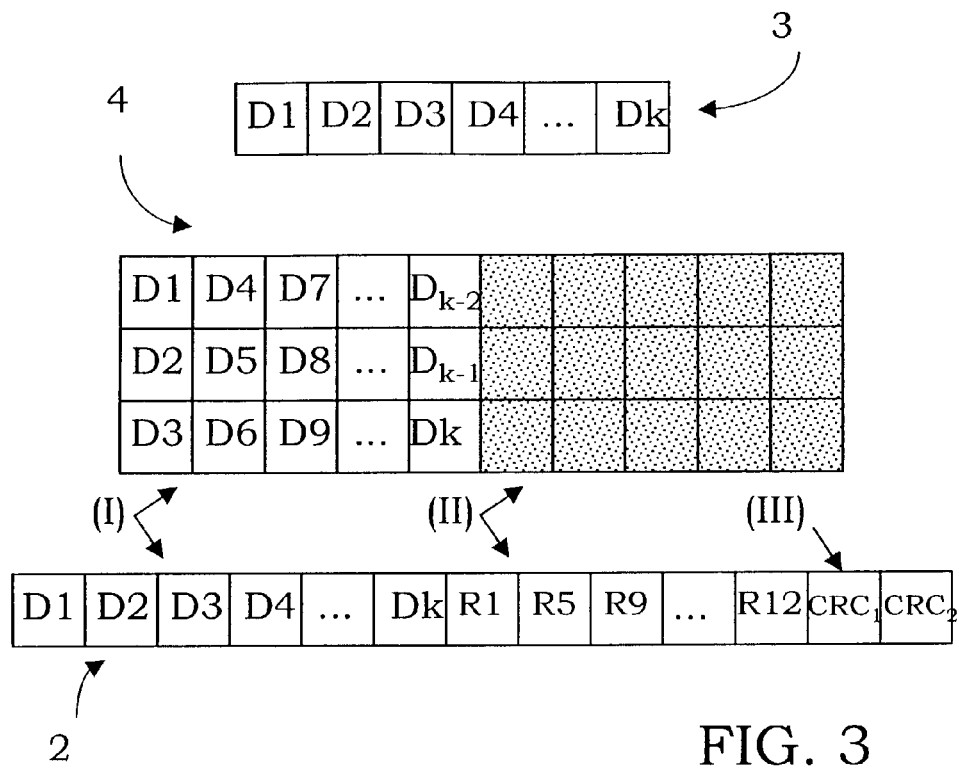
FIG. 3 shows the data setup based on a RS encode/decode according to the prior art.
Figure 4:
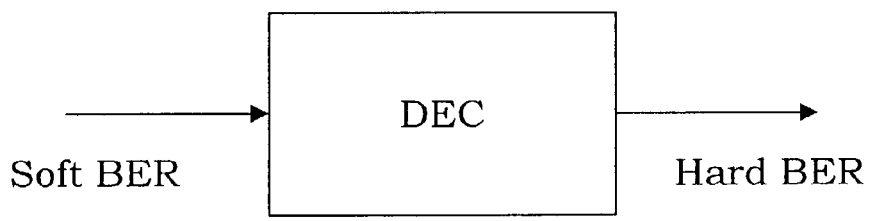
FIG. 4 shows a detail of RS encode/decode according to the prior art.
Figure 5:
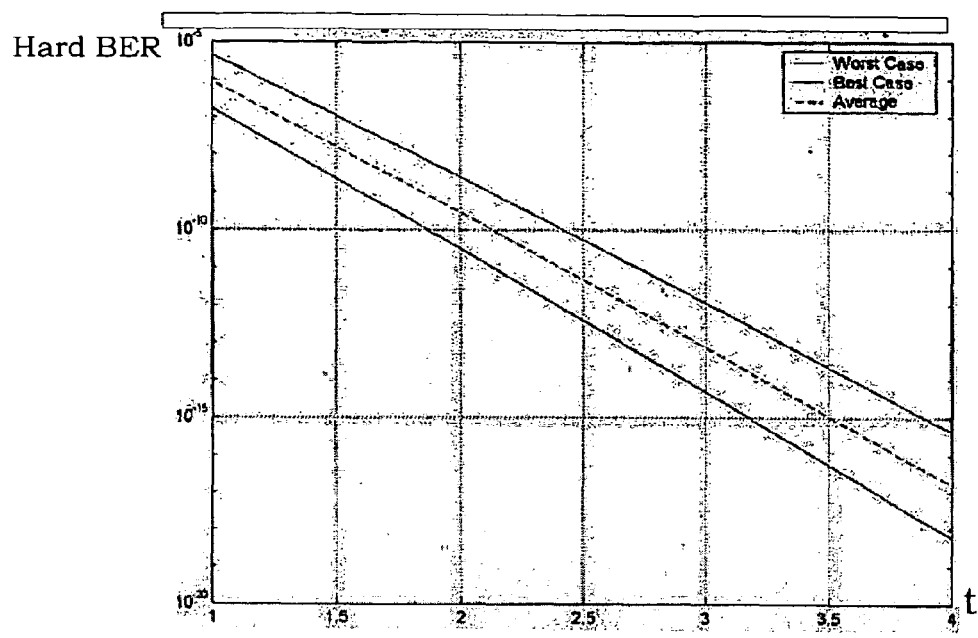
FIG. 5 shows a specific error distribution largely employed in conventional systems.
Figure 6:
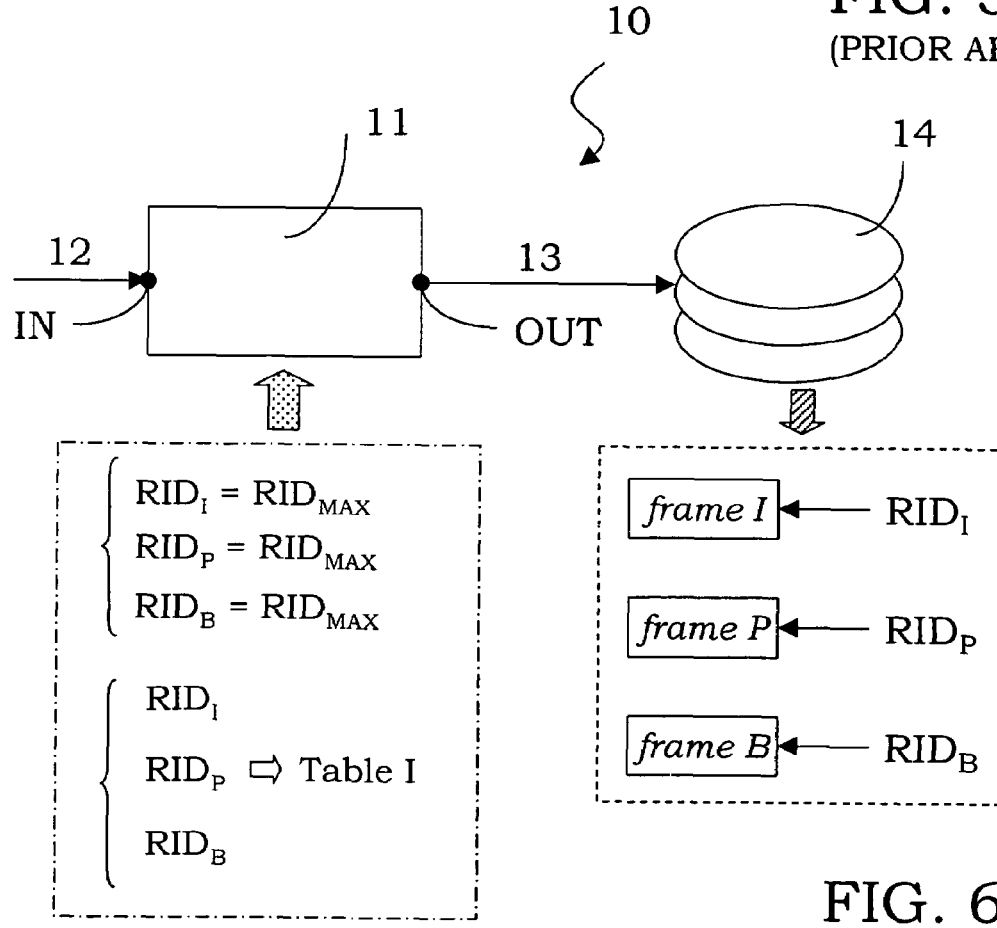
FIG. 6 shows an HDD controller employing a storage method according to an embodiment of this invention.

Referring to FIG. 6, it should be noted that at the audio/video-file recording stage, an HDD or disk controller 11 associated with a storage system such as the MPEG system 10 for processing audio/video files "knows" the type of frame that is to be store, i.e. whether it is an I-, P- or B-frame.

The protection for said frames is obtained from a parameter, specifically a redundancy factor RID associated with each frame.

This is an inherent feature of new-generation controllers, the so-called new-generation HDDs, for PVR camcorder applications, in view of that the controller 11 is to encode a flow 12 of audio/video (AV) data incoming through an input IN into an MPEG file 13 that is output (OUT) to an HDD 14, as shown in FIG. 6.

It can be appreciated from the foregoing that a method of storing data files, particularly in the MPEG format, according to an embodiment of the invention comprises the operations described here below.

1) If a user requests high quality, the controller 11 will use, in storing the MPEG file 13, the same redundancy factor $RID_{MAX}$ for all types of frame.

Thus, this storage method provides the same level of reliability for all the frames, i.e. the same hard BER value as set at $10^{-15}$, for example.

2) If a user does not request high quality, the controller 11 will use, in storing the MPEG file 13, different redundancy factors $RID_I$, $RID_P$, $RID_B$ to suit the frame types.

Thus, this storage method provides different levels of reliability for different type frames, i.e. respective hard BER values for I-, P- or B-frames.

In particular, the values shown in Table I below are used to bring out the play quality for the MPEG encoded audio/video data flow 12.

TABLE I

| Frame | Hard BER |
|---|---|
| I | $10^{-15}$ |
| P | $10^{-10}$ |
| B | $10^{-8}$ |

Advantageously, the redundancy factors $RID_{MAX}$, $RID_I$, $RID_P$, $RID_B$ are added to the ECC (Error Correction Code).

Figure 7:
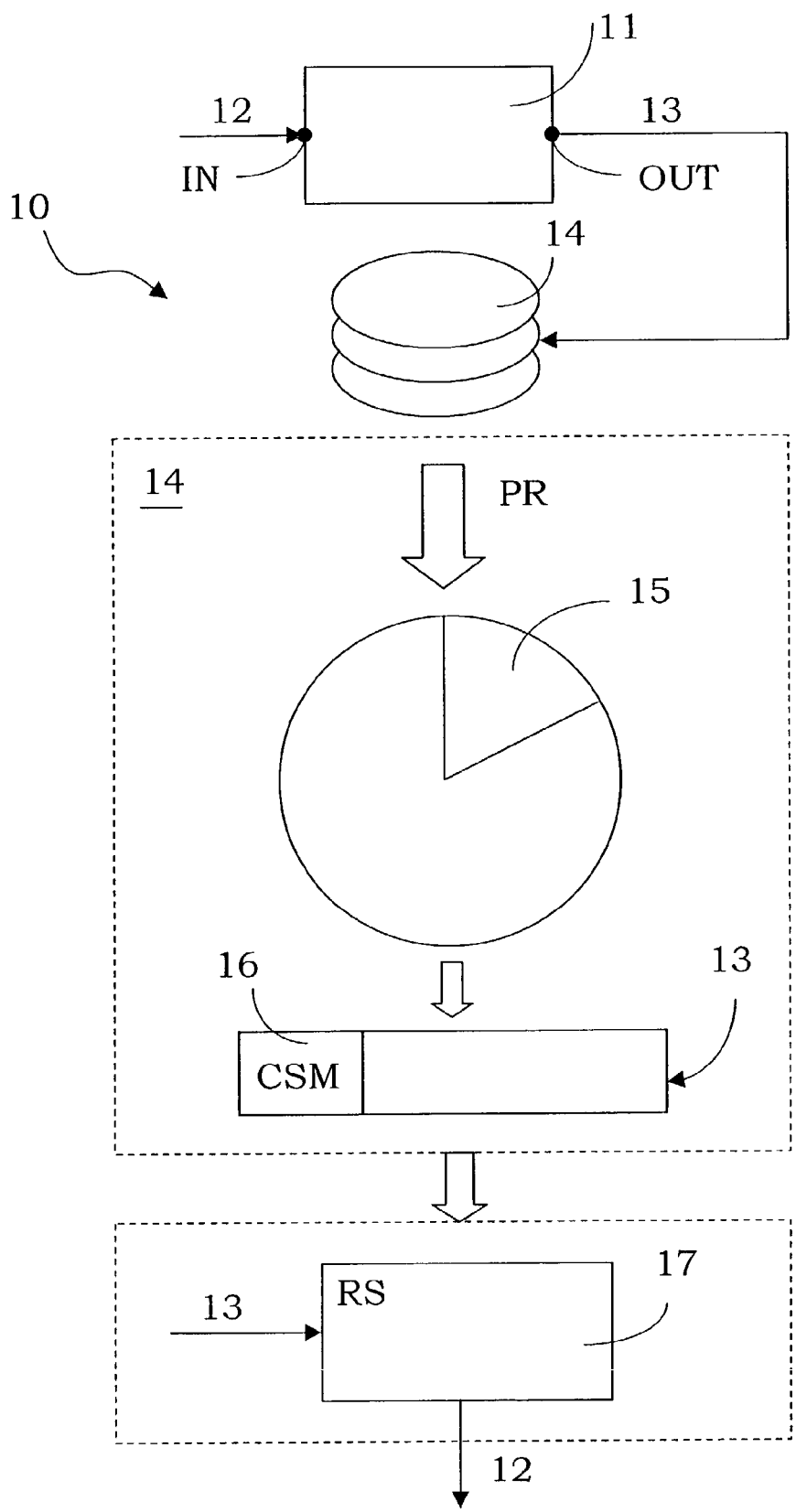
FIG. 7 shows a detail of the controller of FIG. 6.

Let us see now the operation of an HDD system 10, shown in detail in FIG. 7, which implements a storage method according to an embodiment of the invention.

From the hard BER values shown in Table I above, a controller 11 for an HDD 14 provides a PR type of protection for application to a sector 15 being recorded, and marks the sector 15 with a specific CSM (Controller Sync Mark) identification byte at the beginning of a data field 16 of the MPEG file 13.

Then, when the sector 15 is read back, the controller 11 reads the CSM identification byte from the data field 16 and sets a decoder 17, particularly of the RS encode/decode type accordingly. The decoder 17 reconstructs the imaging contents of the original data flow 12 by decoding the MPEG file 13 frame by frame according to the CSM identification byte, and therefore according to the redundancy factor applied to each frame during the compression step.

Figure 8:
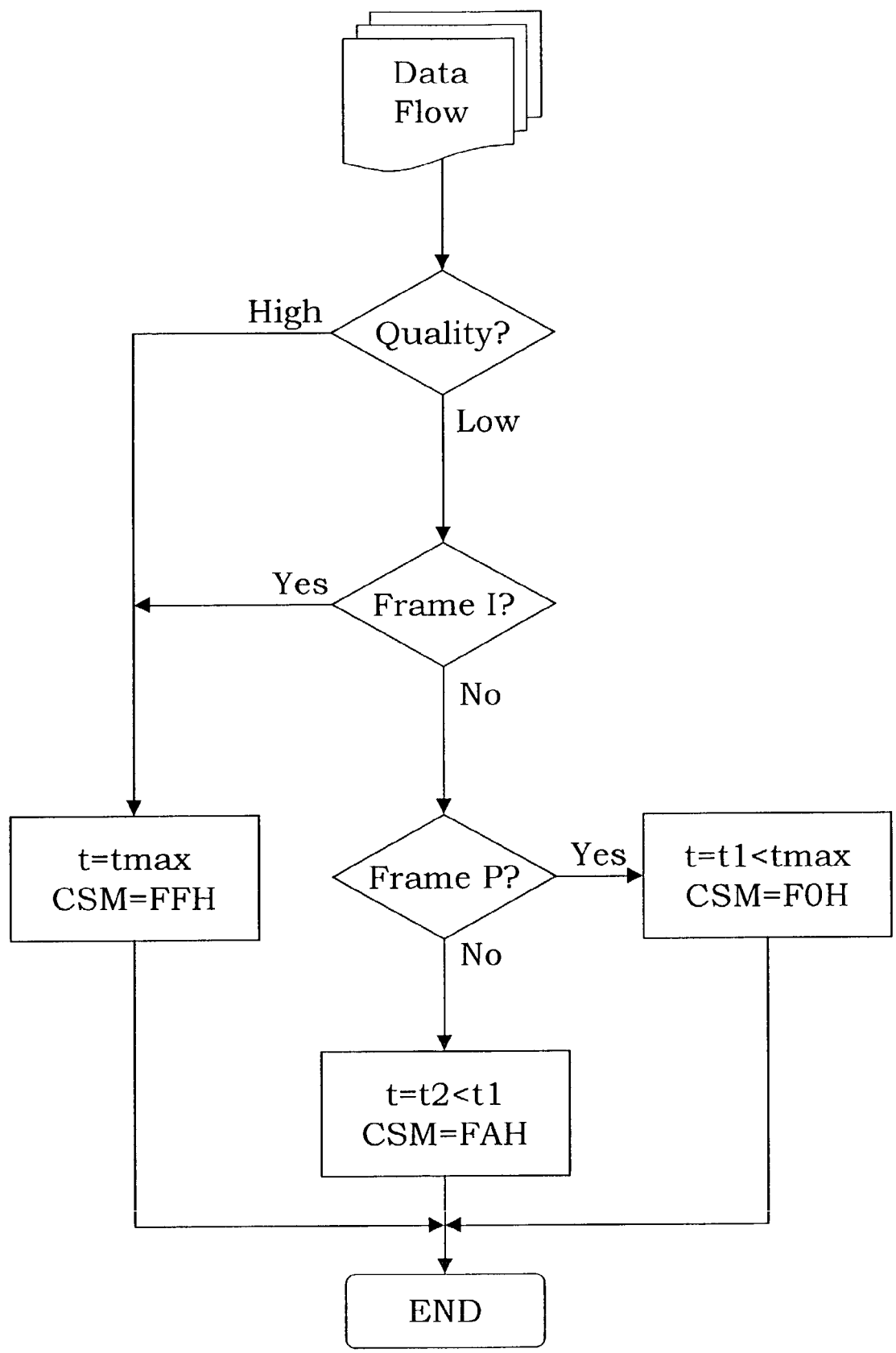
FIG. 8 illustrates a storage method according to an embodiment of this invention by means of a write operation flowchart.

The flowchart of FIG. 8 illustrates graphically the sequence of operations performed by the system 10 using a storage method according to an embodiment of this invention.

In particular, FIG. 8 is a flowchart for a write operation being carried out in the HDD 14, comprising the following steps:

receiving the data flow 12;

checking for a quality level Q (Qhigh/Qlow) requested by an end user.

The method comprises two different sequences of operations according to the quality level requested, i.e. the level of reliability required for each frame type.

When a high quality level (Qhigh) is requested:

allotting a first value FFH to the identification CSM byte, i.e. storing such a value FFH into the data field 16 of the corresponding MPEG file 13, independently of the frame type that is stored;

end of the write operation.

In this way, the storage method provides a same level of reliability and single hard BER value for all the frames.

When a low quality level (Qlow) is requested, the sequential steps become:

scanning one frame to check if it is an I-frame;

in case of positive result, allotting the first value FFH to the identification CSM byte of such a frame, i.e. storing the first value FFH into data field 16 of the corresponding MPEG file 13.

It should be noted that the first value FFH for the identification CSM byte is the same value as is used for high-quality requirements, because the propagation of errors that lead to degradation of the re-constructed image is controlled by I-frames and the level of reliability of I-frames should be the highest.

In case of negative result, scanning the frame to check if it is a P-frame; in case of positive result of this further checking step, allotting a second value F0H to the identification CSM byte of that frame, i.e. storing the second value F0H into data field 16 of the corresponding MPEG file 13;

in case of negative result, allotting a third value FAH to the identification CSM byte of that frame, i.e. storing the third value FAH into data field 16 of the corresponding MPEG file 13;

end of the write operation.

In this way, the storage method provides different levels of reliability according to whether a frame is an I-, P- or B-type.

It should be noted that the different values FFH, F0H and FAH allotted to the identification CSM byte correspond to respective frame redundancies tmax, t1 and t2.

In particular, the redundancy t2 of a B-frame is less than the redundancy t1 of a P-frame, the redundancy of the latter being less than the maximum redundancy tmax of an I-frame.

It can be seen that the flow of read operations has the opposite pattern. In particular, the controller 11 recognizes the frame type from the value stored in the identification CSM byte, and sets consequently the decoder 17 to perform an RS decode according to the known values of the redundancy factors $RID_{MAX}$, $RID_I$, $RID_P$ and $RID_B$.

To assess the extent of the space saving afforded by this storage method, a simulated encode of a MPEG format audio/video file was carried out.

In particular, an MPEG file was used which comprised a single sequence of 4,332,554 bytes. In terms of storage space, this means 8,463 standard sectors, each of 512 bytes.

Two different starting situations were also simulated which corresponded to a soft BER value of either $10^{-5}$ or $10^{-4}$, these being specified values currently in use.

Shown in Table II are, for each starting situation:
a number ECC bytes of redundancy bytes required for storing the MPEG file; and
a percentage OVERHEAD of disk area used.

Table II is comparative of a conventional storage method, in particular using uniform protection for frames of any types to be stored, and the storage according to an embodiment of this invention, using selective protection according to the frame type to be stored.

The percentage OVERHEAD is used as an efficiency parameter of either methods to afford end reliability.

TABLE II

| | Uniform Protection | | Selective Protection | |
|---|---|---|---|---|
| | SBER = $10^{-4}$ | SBER = $10^{-5}$ | SBER = $10^{-4}$ | SBER = $10^{-5}$ |
| ECC Bytes | 330.057 | 228.501 | 221.958 | 163.338 |
| OVERHEAD | 7.6% | 5.3% | 5.1% | 3.8% |

It can be seen from Table II that the gain obtained with the selective protection storage method of this embodiment of the invention may vary between 1.3% and 2.5%, depending on situations.

Table III shows the number of corrections per interleave, i.e. the redundancy parameter t, used in the simulations (interleaving depth is always 3).

TABLE III

| | Uniform Protection | | Selective Protection | |
|---|---|---|---|---|
| | SBER = $10^{-4}$ | SBER = $10^{-5}$ | SBER = $10^{-4}$ | SBER = $10^{-5}$ |
| Number t of corrections per interleave | 6 | 4 | I-frame: t = 6<br>P-frame: t = 4<br>B-frame: t = 3 | I-frame: t = 4<br>P-frame: t = 3<br>B-frame: t = 2 |

A similar simulation, carried out on an MPEG file having a small motion contents, provided exactly the same gain percentages as regards efficiency.

Savings of 1 to 2% are regarded substantial for an HDD system. Such savings, while not reflecting on increased capacity and higher formatting level, advantageously increase the throughput, and hence the final cost, of HDDs.

Although reading to and writing from a disk is described, this selective coding/decoding technique has other applications. For example, an I-, P-, and/or B-frame can be coded having different redundancy factors, transmitted, then decoded at different quality levels using the different redundancy factors.

From the foregoing it will be appreciated that, although specific embodiments of the invention have been described herein for purposes of illustration, various modifications may be made without deviating from the spirit and scope of the invention.

The invention claimed is:

1. A circuit, operable to:
    associate a first quality level with a first portion of a data file;
    associate a second quality level with a second portion of the data file; store the first portions of the data file along with a first quality-level identifier and a first redundancy parameter on a first section of a disk; and
    store the second portion of the data file along with a second quality-level identifier and a second redundancy parameter on a second section of the disk,
    the first redundancy parameter correspond in to a greater number of redundancy bytes than the second redundancy parameter when the first quality level is higher than the second quality level, and the second redundancy parameter corresponding to a greater number of redundancy bytes than the first redundancy parameter when the second quality level is higher than the first quality level.

2. The circuit of claim 1 wherein the first and second portions of the data file respectively comprise first and second video frames.

3. The circuit of claim 1 wherein the first and second portions of the data file respectively comprise first and second MPEG-coded frames.

4. The circuit of claim 1 wherein the first and second quality-level identifiers respectively correspond to first and second error rates.

5. The circuit of claim 1 wherein the first and second quality-level identifiers respectively comprise first and second Reed-Solomon redundancy factors.

6. A circuit, operable to:
    decode a first redundancy parameter and a first portion of a data file such that the decoded first portion has a first quality level; and
    decode a second redundancy parameter and a second portion of the data file such that the decoded second portion has a second quality levels,
    the first redundancy parameter corresponding to a greater number of redundancy bytes than the second redundancy parameter when the first quality level is higher than the second quality level, and the second redundancy parameter corresponding to a greater number of redundancy bytes than the first redundancy parameter when the second quality level is higher than the first quality level.

7. The circuit of claim 6 wherein the first and second portions of the data file respectively comprise first and second coded video frames.

8. The circuit of claim 6 wherein the first and second portions of the data file respectively comprise first and second MPEG-coded video frames.

9. The circuit of claim 6, further operable to:
decode the first portion of the data file using an error-correction code having a first maximum error rate; and
decode the second portion of the data file using an error-correction code having a second maximum error rate.

10. The circuit of claim 6, further operable to:
decode the first portion of the data file using an error-correction code that incorporates a first Reed-Solomon redundancy factor; and
decode the second portion of the data file using an error-correction code that incorporates a second Reed-Solomon redundancy factor.

11. A disk-drive, comprising:
a data-storage disk;
a controller operable to,
  associate a first quality level with a first portion of a data file,
  associate a second quality level with a second portion of the data file,
  store the first portion of the data file together with a first quality-level identifier and a first redundancy parameter on a first section of the disk, and
  store the second portion of the data file together with a second quality-level identifier and a second redundancy parameter on a second section of the disks,
  the first redundancy parameter corresponding to a greater number of redundancy bytes than the second redundancy parameter when the first quality level is higher than the second quality level, and the second redundancy parameter corresponding to a greater number of redundancy bytes than the first redundancy parameter when the second quality level is higher than the first quality level; and
a decoder operable to,
  decode the stored first portion of the data file according to the first quality-level identifier such that the decoded first portion has the first quality level, and
  decode the stored second portion of the data file according to the second quality-level identifier such that the decoded second portion has the second quality level.

12. A method, comprising:
storing a first portion of a data file;
associating a first quality level and a first redundancy parameter with the first portion;
storing a second portion of the data file; and
associating a second quality level and a second redundancy parameter with the second portion,
the first redundancy parameter corresponding to a greater number of redundancy bytes than the second redundancy parameter when the first quality level is higher than the second quality level, and the second redundancy parameter corresponding to a greater number of redundancy bytes than the first redundancy parameter when the second quality level is higher than the first quality level.

13. The method of claim 12 wherein:
storing the first portion of the data file comprises storing a first video frame; and
storing the second portion of the data file comprises storing a second video frame.

14. The method of claim 12 wherein:
storing the first portion of the data file comprises storing a first MPEG-coded frame; and
storing the second portion of the data file comprises storing a MPEG-coded frame.

15. The method of claim 12 wherein:
storing the first portion of the data file comprises storing an I-coded frame; and
storing the second portion of the data file comprises storing a P-coded frame.

16. The method of claim 12 wherein:
storing the first portion of the data file comprises storing an I-coded frame; and
storing the second portion of the data file comprises storing a B-coded frame.

17. The method of claim 12 wherein:
storing the first portion of the data file comprises storing a P-coded frame; and
storing the second portion of the data file comprises storing a B-coded frame.

18. The method of claim 12 wherein:
associating the first quality level with the first portion of the data file comprises associating a first acceptable error rate with the first portion; and
associating the second quality level with the second portion of the data file comprises associating a second acceptable error rate with the second portion.

19. The method of claim 12 wherein:
associating the first quality level with the first portion of the data file comprises associating a first Reed-Solomon redundancy factor with the first portion of the data file and storing the first redundancy factor; and
associating the second quality level with the second portion of the data file comprises associating a second Reed-Solomon redundancy factor with the second portion of the data file and storing the second redundancy factor.

20. A method, comprising:
decoding a first redundancy parameter and a first portion of a data file such that the decoded first portion has a first quality level; and
decoding a second redundancy parameter and a second portion of the data file such that the decoded second portion has a second quality level
the first redundancy parameter corresponding to a greater number of redundancy bytes than the second redundancy parameter when the first quality level is higher than the second quality level, and the second redundancy parameter corresponding to a greater number of redundancy bytes than the first redundancy parameter when the second quality level is higher than the first quality level.

21. The method of claim 20 wherein:
decoding the first portion of the data file comprises decoding a first coded video frame; and
decoding the second portion of the data file comprises decoding a second coded video frame.

22. The method of claim 20 wherein:
decoding the first portion of the data file comprises decoding a first MPEG-coded frame; and
decoding the second portion of the data file comprises decoding a second MPEG-coded frame.

23. The method of claim 20 wherein:
decoding the first portion of the data file comprises decoding an I-coded frame; and
decoding the second portion of the data file comprises decoding a P-coded frame.

24. The method of claim 20 wherein:
decoding the first portion of the data file comprises decoding an I-coded frame; and
decoding the second portion of the data file comprises decoding a B-coded frame.

25. The method of claim 20 wherein:
decoding the first portion of the data file comprises storing a P-coded frame; and
decoding the second portion of the data file comprises storing a B-coded frame.

26. The method of claim 20 wherein:
decoding the first portion of the data file comprises decoding the first portion using an error-correction code having a first maximum error rate; and
decoding the second portion of the data file comprises decoding the second portion using an error-correction code having a second maximum error rate.

27. The method of claim 20 wherein:
decoding the first portion of the data file comprises decoding the first portion using an error-correction code that incorporates a first Reed-Solomon redundancy factor; and
decoding the second portion of the data file comprises decoding the second portion using an error-correction code that incorporates a second Reed-Solomon redundancy factor.

28. A method, comprising:
transmitting a first portion of a data file along with a corresponding first quality-level identifier and a first redundancy parameter; and
transmitting a second portion of the data file along with a corresponding second quality-level identifier and a second redundancy parameter.
the first redundancy parameter corresponding to a greater number of redundancy bytes than the second redundancy parameter when the first portion has a higher quality level than the second portion, and the second redundancy parameter corresponding to a greater number of redundancy bytes than the first redundancy parameter when the second portion has a higher quality level than the first portion.

29. The method of claim 28 wherein the first and second portions of the data file comprise respective video frames.

30. The method of claim 28 wherein the first and second portions of the data file comprise respective MPEG-coded frames.

31. The method of claim 28 wherein the first and second quality-level identifiers correspond to respective first and second maximum error rates.

32. The method of claim 28 wherein the first and second quality-level identifiers correspond to respective first and second Reed-Solomon redundancy factors.

* * * * *

UNITED STATES PATENT AND TRADEMARK OFFICE
CERTIFICATE OF CORRECTION

| | |
|---|---|
| PATENT NO. | : 7,295,764 B2 |
| APPLICATION NO. | : 10/177729 |
| DATED | : November 13, 2007 |
| INVENTOR(S) | : Giorgio Betti et al. |

It is certified that error appears in the above-identified patent and that said Letters Patent is hereby corrected as shown below:

Column 8 Claim 1 line 26 omit the word "in" and change "correspond" to --corresponding--

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,295,764 B2 Page 1 of 1
APPLICATION NO. : 10/177729
DATED : November 13, 2007
INVENTOR(S) : Giorgio Betti et al.

It is certified that error appears in the above-identified patent and that said Letters Patent is hereby corrected as shown below:

Column 8 Claim 1 line 26 omit the word --in-- and change "correspond" to "corresponding"

Signed and Sealed this

Second Day of December, 2008

JON W. DUDAS
*Director of the United States Patent and Trademark Office*